May 23, 1944.　　　S. S. GREEN　　　2,349,347
WATT-HOUR METER
Filed Sept. 24, 1942
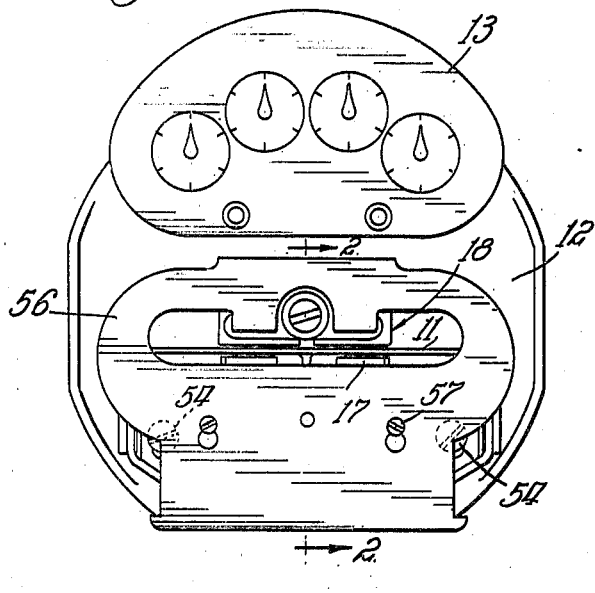
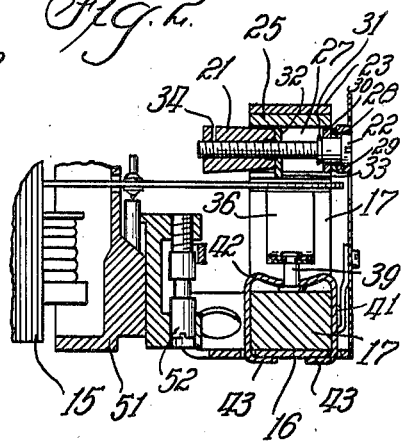
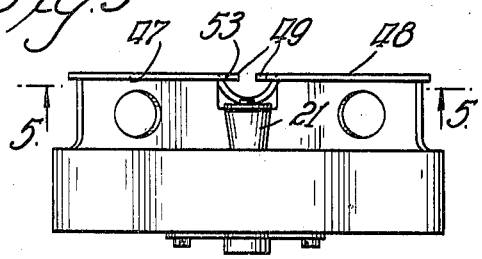
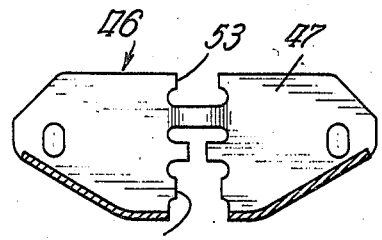
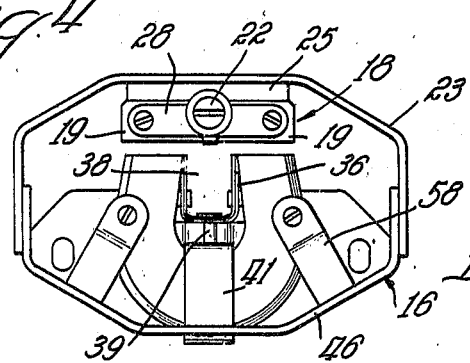
Inventor:
Stanley S. Green
By Mann, Brown & Co.
Attys.

Patented May 23, 1944

2,349,347

UNITED STATES PATENT OFFICE 2,349,347

WATT-HOUR METER

Stanley S. Green, La Fayette, Ind., assignor to Duncan Electric Manufacturing Company, La Fayette, Ind., a corporation of Illinois Application September 24, 1942, Serial No. 459,513

11 Claims. (Cl. 171—264)

One of the important considerations in the manufacture of watt-hour meters is the mounting of the damping or retarding magnets. The damping magnet forms a gap with a strong magnetic field therein through which the meter disk rotates. The magnet does not touch the disk but the magnetic field exerts a retarding force on the disk which varies accurately with the speed of the disk, approaching zero as the speed approaches zero. The disk is driven inductively by the voltage and current coils of the meter.

The present invention culminates a long string of improvements in the damping units of watt-hour meters disclosed in my prior patents. One object of the present invention is to provide the advantages of these various inventions without the use of non-magnetic support means. Patent No. 2,149,287 discloses the principle of using a micrometer adjustment which, in spite of its extreme delicacy and in spite of being operable by a screw driver from the front of the meter, has a range of adjustment wide enough to take care of the entire full load adjustment needs encountered in manufacture of the meter.

Another improvement (Patent No. 2,110,418) is the use in watt-hour meters of the high coercive magnet metal known as "Alnico," with its advantages of economy in space and weight, and its surprising ability to retain its original calibrated strength in spite of being subjected to lightning surges and the like, which would have weakened former magnets. Further uniformity was obtained (Patent No. 2,252,483) by devising a vertically adjustable mounting by which an adjustment could be made for centering the disk in the gap.

In the form of damping unit preferred heretofore, it was found that best economy and simplicity were obtained by arranging the Alnico with opposed poles adjacent to one face of the disk and an armature opposite the poles and adjacent to the other face of the disk, thus forming two gaps through which the disk rotates. For the purpose of economy, it is preferred that the armature be soft iron, but it could be permanently magnetic, if preferred. Of course, the armature must be rigidly supported with respect to the magnet. This has seemed to require a non-magnetic support.

The desired range of adjustment can best be obtained by a plug in the armature which, in one position, makes the armature substantially continuous so that a magnetic circuit of extremely low reluctance is formed through the magnet and through the armature. To decrease the flux through the gaps, the plug is moved out of position so that the reluctance of the path is greatly increased. An alternative method, in which a shunt is moved into a position to divert flux from the disk to decrease the retarding effect, is not as economical because it is virtually impossible to get the shunt so far away that it doesn't continue to divert some flux, and is not likely to have as wide a range of adjustment because when the reluctance of the useful path is made as low as possible for such a path, it is difficult to divert a very high percentage of the flux therefrom.

According to the present invention, all of the advantages above discussed are maintained in spite of the fact that a mounting means of magnetic metal which, prior to this invention, seemed to be out of the question with this type of damping unit, has been substituted for the aluminum mounting heretofore used. Furthermore, the magnetic mounting has an advantage not only in being cheaper and being more certainly available than the aluminum mounting, but in making the unit even more resistant to the weakening tendencies of lightning surges than heretofore.

One important factor contributing to lightning resistance and the possibility of using the magnetic mounting is the inclusion of a non-magnetic spacing member between the magnetic mounting and the armature. This spacing of the armature from the magnetic mounting means need not be very great since a relatively small magnetic separation is enough to render the adjustment plug effective and to cause all but a negligible percentage of the flux to traverse the desired paths.

As a further surprising item of economy and simplicity, it has been found that a spring clip of magnetic metal can be used adjacent to the central neutral point of the magnet for mounting the magnet in place and also for mounting a temperature compensator adjacent the magnet. The flux diversion due to the presence of the magnetic metal at this point seems to be negligible.

Additional objects and advantages of the invention will be apparent from the following description and from the drawing, in which Fig. 1 is a front view of a meter mechanism embodying the form of the present invention chosen for the purpose of illustration;

Fig. 2 is a fragmentary sectional view taken approximately on the line 2—2 of Fig. 1;

Fig. 3 is a plan view of the damping unit shown in Figs. 1 and 2;

Fig. 4 is a front view of the same; and

Fig. 5 is a sectional view taken approximately on the line 5—5 of Fig. 1.

Although this invention may take numerous forms, only one has been chosen for the purpose of illustration and description, but persons skilled in the art will readily perceive other means for accomplishing the same results, and the claims are therefore to be construed as broadly as possible, consistent with the prior art.

In the illustrated form, the invention has been illustrated in conjunction with a watt-hour meter including a disk 11 carried by a main frame 12 and driven by an electromagnet driving unit 15. The disk 11 will of course be geared to any suitable indicating device such as the register 13.

The damping unit of this invention includes an auxiliary frame 16, a permanent magnet 17 secured thereto, and an armature indicated generally by the reference numeral 18. The magnet 17 is of horseshoe shape (U shape). Of course, functionally, the chief characteristic of the horseshoe magnet is the provision of two opposed poles close together and adjacent to one face of the disk 11. Hence although it is most economical to form the horseshoe magnet as a single casting of Alnico, this is not essential. It may be composite and may even include some soft iron sections. The armature comprises a pair of magnetic blocks 19 and a magnetic plug 21 which can be slid in and out between them and is operated by an adjusting screw 22.

The blocks 19 may conveniently be secured to the upper portion 23 of the frame 16 by means of screws or rivets, but is preferably secured by spot welding at two spots on each block 19. As a matter of fact, for reasons later described, a non-magnetic spacer 25 is positioned between the blocks 19 and the upper frame member 23 during the welding so that the three are welded together.

A screw 22 is journalled in a plate 28, end play being prevented by bushings 29 and 30 which are held in place by upsetting the hub of the screw 22 as seen at 31. Side play is prevented by the bushing 30 which preferably has a snug fit with the slot or aperture in which the plug 21 moves. The hole in plate 28 through which the screw passes is preferably oversize so that accuracy in positioning the plate with respect to the plug slot will not be necessary.

The plug 21 is threaded on the screw 22 and is restrained from turning by a non-magnetic key plate 32 having a lug 33 which extends downwardly beyond the cylindrical portion of the plug slot. If desirable, the plug may be slit near its end, as at 34, and deformed so as to eliminate slack in its engagement with the screw. At present it is preferred to merely provide fairly close fitting threads extending most of the length of the plug. The key plate 32 preferably fits the cylindrical plug slot fairly snugly as does the larger end of the plug 21 so that all movements which would cause magnetic variations are prevented except for a longitudinal movement of the plug 21 in response to turning the screw 22. It will be observed that this can be done from the front of the meter with a screw driver. This is very desirable since a screw driver is a standard tool and since the front position is never obstructed. It will be noted that the bushing 29 preferably extends at least as far as a position flush with the head of the screw so that a screw driver will not drop out of the slot when the latter is in vertical position.

The plug 21 is preferably tapered, as illustrated, so as to have approximately straight line adjustment characteristics throughout at least most of the range of movement of the plug. In other words, within the range of movement which is ordinarily used, a quarter turn of the screw will produce approximately the same correction in the meter calibration. It is thus seen that the calibration of the meter with respect to full load adjustment is made as convenient as possible.

It is standard practice to provide temperature compensating means in conjunction with the damping magnet. This temperature compensation commonly comprises a small shunt of nickel steel or other metal having a suitable negative temperature coefficient of permeability indicating decreased permeability with rising temperature.

According to the present invention, the temperature compensation is provided in the form of two thin strips 36 of nickel steel having their ends close inside the horseshoe adjacent the poles of the magnet. These strips are shaped as illustrated so as to provide a passage through the horseshoe for the reception of a magnetizing bar. These strips are secured at the top of a spacing rivet 39 a head of which lies under a clip 41. As seen best in Fig. 2, the clip 41 thus serves to hold both the temperature compensating plate 36 and the magnet 17 in position. It will be observed that the clip 41 does not bear on the upper side of the magnet adjacent to the crimped portions 42 of the clips at the sides of the clips, but bears against the magnet through the head of rivet 39 only at the central portion of the clip 41. It is thus possible to turn down the ends 43 of clip 41 while it is held in a distorted position with the crimps 42 pressed downwardly. When the external force is removed, the ends or lugs 43 will hold the clip under tension so that the magnet 17 will be very firmly held. The magnets should be ground flat at their bottoms so as to seat firmly.

The frame 16 is conveniently made up of two parts, the upper part 23 and the lower part 46. These parts may conveniently be welded together by spot welding after the magnet and armature have been secured to their respective portions of the frame. With the clip 41 under tension, the armature blocks 19 welded to the frame and the portions of the frame welded together, it is evident that there is no chance for accidental variations during service.

The lower portion 46 of the frame includes a rear flange 47 which is shaped with a sliding face 48 and lugs 49 for engaging a bracket 51 and the slot in a screw 52 to provide gap centering adjustment as described in my prior Patent No. 2,252,483. Canting is prevented by cooperation of shoulders 53 with corresponding lugs on the bracket. Screws 54 should be tightened to hold the unit rigid after the gap centering adjustment. It will be noted that the entire unit, comprising the member 46 and all of the parts carried thereby, can be substituted on old brackets 51 in place of the units shown in said patent.

The non-magnetic spacer 25 is an important feature of this invention. In spite of the fact that it is a very thin piece of metal, it has been proved sufficient to render the plug 21 effective in providing the necessary adjustment. Without the magnetic spacer, the flux would jump too freely from one block 19 to the other through the adjacent magnetic member 23. This spacer, even though it is thin, is also advantageous in increasing the shielding effect of the frame 16 in protecting the magnet 15 from weakening effects of stray fields such as those resulting from a surge of current produced by or following lightning. The magnetic frame tends to divert any such stray magnetism away from the magnet and the spacer 25 makes the path for such magnetism through the magnet much less permeable than the path through the frame so that the stray magnetism prefers the path through the frame.

It is very desirable to have astatic fields by which is meant two fields adjacent to each other one passing upwardly through the disk and the other passing downwardly through the disk. The horseshoe magnet lends itself admirably to this since a single flux circuit passes upwardly to the armature and downwardly to the magnet. It has been found that with the spacer 25, the magnetic frame 46 has almost no effect in causing the flux to pass from the armature around through the frame to the neutral points of the magnet at the center of the horseshoe. Likewise, it has been found that the magnetic clip 41 has a negligible magnetic effect because of its being positioned at the neutral points of the magnet. Accordingly this clip could be made of spring steel although cold rolled steel has been found to have sufficient resilient strength.

Nearly all the parts except the Alnico magnet and the nickel steel temperature compensator may be made of cold rolled steel. Besides the spacer 25, the name plate 56, the attachment screws 57, the screw journalling plate 28, and the bushings 29 and 30 should be made of non-magnetic material. It has been found unnecessary for the name plate brackets 58 to be non-magnetic since they are substantially spaced from the magnet and the very slight flux which they divert is constant. The key plate 32 should also be non-magnetic. Likewise, if rivets or screws are used to secure the armature block 19 to the frames 16, these rivets or screws should be non-magnetic. Although the temperature compensators have been referred to as nickel steel, they may be of any other suitable compensating metal, and in fact, one advantage of using two strips is that they may be of somewhat different alloys to produce the best possible compensating curve.

From the foregoing, it is seen that a damping unit is provided which utilizes cold rolled steel or light, readily available metal for the frame spacing the armature from the magnet and mounting the two together in such a way as to provide the various features heretofore found most satisfactory in these damping units. In addition to preserving the ease and accuracy of adjustment, the simplicity and economy of structure, the invariability after adjustment, the cold rolled steel frame spaced at one side from the magnetic part of the unit, in combination with the use of Alnico, provide greater resistance to the weakening effects of lightning surges than has heretofore been thought practicable.

I claim:

1. A damping unit for watt-hour meters including a yoke of magnetic material, a U-shaped magnet secured approximately at its neutral point to said yoke, an armature carried by the yoke opposite to but spaced from the poles of the magnet and including a plug movable into and outwardly from the armature to decrease and increase the reluctance of the path between the poles through the armature, and a non-magnetic spacer separating the armature from the magnetic yoke, said yoke surrounding the magnet to protect it from stray magnetic fields.

2. A damping unit for watt-hour meters including a yoke of magnetic material, a U-shaped magnet secured approximately at its neutral point to said yoke, an armature carried by the yoke opposite to but spaced from the poles of the magnet and including a plug movable into and outwardly from the armature to decrease and increase the reluctance of the path between the poles through the armature, and a non-magnetic spacer separating the armature from the magnetic yoke.

3. A damping unit for watt-hour meters including a loke of magnetic material, a unitary U-shaped magnet secured approximately at its neutral point to said yoke, an armature carried by the yoke opposite to but spaced from the poles of the magnet and including a plug movable into and outwardly from the armature to decrease and increase the reluctance of the path between the poles through the armature, and a non-magnetic spacer separating the armature from the magnetic yoke.

4. A damping unit for watt-hour meters including a yoke of magnetic material, a U-shaped magnet secured approximately at its neutral point to said yoke, an armature carried by the yoke opposite to but spaced from the poles of the magnet and including a plug movable into and outwardly from the armature to decrease and increase the reluctance of the path between the poles through the armature, a non-magnetic spacer separating the armature from the magnetic yoke, said magnet being secured to the yoke by a spring clip of magnetic material extending around the magnet and clamping it against the yoke, and a temperature compensating member secured to said spring clip and having its ends adjacent to pole portions of the magnet.

5. A damping unit for watt-hour meters including a yoke of magnetic material, a U-shaped magnet secured approximately at its neutral point to said yoke, an armature carried by the yoke opposite to but spaced from the poles of the magnet and including a plug movable into and outwardly from the armature to decrease and increase the reluctance of the path between the poles through the armature, and a non-magnetic spacer separating the armature from the magnetic yoke, said magnet being secured to the yoke by a spring clip of magnetic material extending around the magnet and clamping it against the yoke.

6. A damping unit for watt-hour meters including a yoke of magnetic material, a U-shaped magnet secured approximately at its neutral point to said yoke, an armature carried by the yoke opposite to but spaced from the poles of the magnet and including a plug movable into and outwardly from the armature to decrease and increase the reluctance of the path between the poles through the armature, a non-magnetic spacer separating the armature from the magnetic yoke, said magnet being secured to the yoke by a spring clip of magnetic material extending around the magnet and clamping it against the yoke, and a temperature compensating member secured to said spring clip and having its ends adjacent to pole portions of the magnet, said compensating member being U-shaped to permit access of a magnetizing bar between the legs of the magnet.

7. A damping unit for watt-hour meters including a yoke of magnetic material, a U-shaped magnet secured approximately at its neutral point to said yoke, an armature carried by the yoke opposite to but spaced from the poles of the magnet and including a plug movable into and outwardly from the armature to decrease and increase the reluctance of the path between the poles through the armature, and a non-magnetic spacer separating the armature from the magnetic yoke, said yoke being formed of two generally U-shaped members of cold rolled steel rigidly secured together at their ends.

8. A damping unit for watt-hour meters including a yoke of magnetic material, a U-shaped magnet secured approximately at its neutral point to said yoke, an armature carried by the yoke opposite to but spaced from the poles of the magnet and including a plug movable into and outwardly from the armature to decrease and increase the reluctance of the path between the poles through the armature, and a non-magnetic spacer separating the armature from the magnetic yoke, said yoke having a mounting plate formed integrally with a part thereof and adapted to slidably interfit with a bracket for a gap centering adjustment with respect to the disk.

9. A damping unit for watt-hour meters including a yoke of magnetic material, a U-shaped magnet carried by said yoke, an armature carried and surrounded by the yoke opposite to but spaced from the poles of the magnet and including a plug movable into and outwardly from the armature to decrease and increase the reluctance of the path between the poles through the armature, and a non-magnetic spacer separating the armature from the magnetic yoke, said yoke having a mounting plate formed integrally with a part thereof and adapted to slidably interfit with a bracket for a gap centering adjustment with respect to the disk.

10. A damping unit for watt-hour meters including a yoke of magnetic material, a permanent magnet means carried and surrounded by the yoke and having opposed poles adapted to be adjacent to one face of the disk, an armature carried by the yoke opposite to but spaced from the poles of the magnet and including a plug movable into and outwardly from the armature to decrease and increase the reluctance of the path between the poles through the armature, and a non-magnetic spacer separating the armature from the magnetic yoke, said yoke having a mounting plate formed integrally with a part thereof and adapted to slidably interfit with a bracket for a gap centering adjustment with respect to the disk.

11. A damping unit for watt-hour meters including a yoke of generally non-retentive magnetic material, a U-shaped magnet secured approximately at its neutral point to said yoke surrounded by the yoke and having a cross-sectional area at its neutral point at least as large as at any other point, an armature carried by the yoke opposite to but spaced from the poles of the magnet and including a plug movable into and outwardly from the armature to decrease and increase the reluctance of the path between the poles through the armature, and a non-magnetic spacer separating the armature from the magnetic yoke, said yoke surrounding the magnet to protect it from stray magnetic fields.

STANLEY S. GREEN.

CERTIFICATE OF CORRECTION.

Patent No. 2,349,347. May 23, 1944.

STANLEY S. GREEN.

It is hereby certified that error appears in the printed specification of the above numbered patent requiring correction as follows: Page 4, first column, line 34, claim 9, before the word "by" strike out "and surrounded" and insert the same after "carried" in line 33, same line; and that the said Letters Patent should be read with this correction therein that the same may conform to the record of the case in the Patent Office.

Signed and sealed this 8th day of August, A. D. 1944.

(Seal)

Leslie Frazer
Acting Commissioner of Patents.